L. R. GRUSS.
PNEUMATIC CUSHION FOR VEHICLES.
APPLICATION FILED JUNE 20, 1910.

985,162.

Patented Feb. 28, 1911.

Witnesses:
F. E. Maynard.
T. Castberg.

Inventor,
Lucien R. Gruss,
By G. H. Strong
his Attys

UNITED STATES PATENT OFFICE.

LUCIEN R. GRUSS, OF CHICO, CALIFORNIA, ASSIGNOR TO THE PNEUMATIC CUSHION COMPANY, INC., OF PHOENIX, ARIZONA TERRITORY, A CORPORATION OF ARIZONA TERRITORY.

PNEUMATIC CUSHION FOR VEHICLES.

985,162.　　　　　　　　Specification of Letters Patent.　　Patented Feb. 28, 1911.

Application filed June 20, 1910. Serial No. 567,789.

*To all whom it may concern:*

Be it known that I, LUCIEN R. GRUSS, a citizen of the United States, residing at Chico, in the county of Butte and State of California, have invented new and useful Improvements in Pneumatic Cushions for Vehicles, of which the following is a specification.

My invention relates to vehicles, and particularly to resilient supports for the same.

The object of my invention is to provide a pneumatic cushion for the bodies of automobiles and other vehicles designed to do away with the ordinary metal springs, and thereby to reduce the more or less abrupt vibrations of the vehicle body as the machine travels over uneven road beds; and also to provide in combination a means whereby the vehicle body is supported on a pneumatic cushion, the pressure of which is at all times directly under the control of the operator, with means carried by the vehicle whereby the pressure may be increased without extraneous apparatus.

The invention consists of the parts and the construction and combination of parts as hereinafter more fully described and claimed, having reference to the accompanying drawings, in which—

Figure 1:
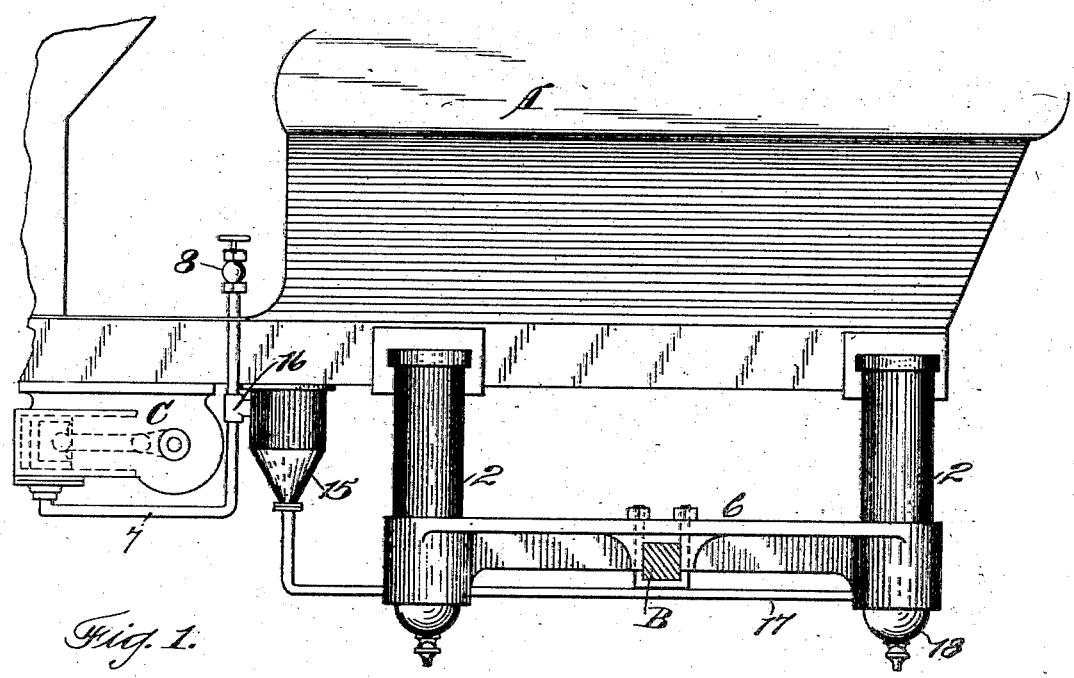
Figure 2:
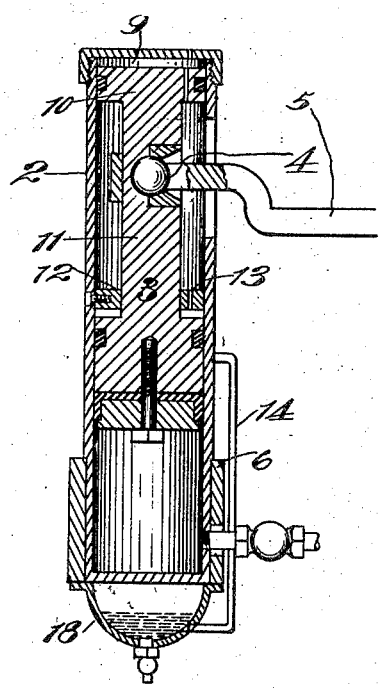

Figure 1 is a side elevation of a portion of a vehicle showing the device. Fig. 2 is an enlarged sectional detail of a cylinder.

In the present embodiment of my invention, I have shown interposed between the vehicle body A and axle B of the vehicle, suitable cylinders 2, within which are slidable pistons 3, connected by universal joints 4 and links 5 to the vehicle body A. The lower portion of each cylinder 2 is seated in a suitable saddle or yoke 6, secured crosswise of the axles B in such fashion that the cylinders 2 and their pistons and connections with the body yieldingly support the body similarly to the ordinary elliptic springs.

In order to sustain the load of the vehicle on the pistons 3, fluid is forced into the cylinders by means of a suitable compressor C, operated from the engine, or otherwise, and having fluid connections or pipes 7 with each of the cylinders 2; a branch of the pipe 7 being led to the operator's seat and provided with a valve 8, whereby the operator may reduce the pressure in the system, if desired, when the car is in motion. Thus, when the vehicle is traveling the load is imposed on pneumatic cylinders as the piston 3 is reacted upon by the compressed fluid.

A particular feature of this invention is in so constructing the cylinder that it not only affords a cushion chamber for fluid to support the load, but its upper end is closed and forms a dash-pot 9, in which is workable the head 10 of the piston rod 11 of piston 3. This dash-pot is effective as a shock absorber when there is an excessive rebound of the vehicle body, so that by the double chambered cylinders and double ended pistons the car body is allowed a reasonable vertical motion and any excess of motion up or down is gradually checked without any shock.

The cylinder 2 (Fig. 2) is provided at its middle with a wall or diaphragm 12, having a small relief opening 13 to prevent resistance as the piston descends, and secured to the cylinder is a small oil tube 14, whereby oil may be conveyed to lubricate the piston.

When the apparatus is to be used for heavy vehicles, I may introduce an auxiliary air-container 15, connected at 16 to pipe 7 so that air under pressure may be forced in on top of a volume of oil or other fluid which may pass to and fro between the container and the several cylinders 2, these being connected by conduits 17. The pistons 3 in their respective cylinders are then effective against an oil cushion which is subjected to air pressure in the auxiliary pressure chamber 15.

Suitable traps 18 are secured to the cylinders 2 to catch any oil which may possibly escape at the several joints, and it is to these traps that the lubricating oil tubes 14 may be connected.

The apparatus affords a reliable, sensitive, shock-absorbing connection between the body and the track of the vehicle, and the body is not subjected, in the same degree, to the jolts as it would be if ordinary springs were employed.

After the system is once charged by the compressor C, there is practically no loss by leakage and the pistons are all subjected to a uniform pressure which may be released at valve 8, or increased by the pump.

The dual functions of the piston as a buffer for the down thrust of the load and as a recoil shock absorber entirely eliminate all necessity of springs or other devices.

It is manifest or possible that the construction herein specified may be varied without departing from the principle of the invention, and I desire it to be understood that the invention is not limited to any specific form or arrangement of parts, except in so far as such limitations or their mechanical equivalents are specified in the claims.

Having thus described my invention, what I claim and desire to secure by Letters-Patent, is—

1. The combination in a vehicle, of the body and an axle thereof, an air cylinder supported on one of said parts and a piston connected to the other of said parts, one end of the cylinder forming a dash-pot, and said piston having end heads and an intermediate reduced portion to which portion the vehicle body is connected, an air compressor on the vehicle connected with the cylinder to maintain an air pressure therein and provide an air cushion for the piston, a manually-operated reducing valve between the compressor and the cylinder and disposed adjacent the seat of the operator for arbitrarily reducing the pressure in said cylinder, and a diaphragm extending across the cylinder and pierced to receive the reduced portion of the piston, said diaphragm having a relief opening to prevent resistance as the piston descends.

2. The combination in a vehicle, of the body and an axle thereof, an air cylinder supported on one of said parts and a piston connected to the other of said parts, said piston having end heads and an intermediate reduced portion, said heads working in the cylinder, an air compressor on the vehicle connected with the cylinder to maintain an air pressure therein and provide an air cushion for the piston, one end of the cylinder forming a dash-pot, and said cylinder having a diaphragm extending across it and pierced to receive the reduced portion of the piston and having a relief opening to prevent resistance as the piston descends.

3. The combination in a vehicle, of the body and an axle thereof, a pair of cylinders, a saddle secured to the axle and extending right and left therefrom and forming a support for the cylinders, a piston operating in each cylinder having end heads and an intermediate reduced portion, means connecting the reduced portion of the piston to the vehicle body, compressor means independent of the cylinders for storing air and having fluid connections with the cylinders for creating and maintaining an air pressure therein to support the pistons, and a diaphragm extending across the cylinder and pierced to receive the reduced portion of the piston and having a relief opening to prevent resistance as the piston descends.

In testimony whereof I have hereunto set my hand in the presence of two subscribing witnesses.

LUCIEN R. GRUSS.

Witnesses:
C. L. STILSON,
ELEANOR F. STILSON.